US012794076B2

(12) United States Patent
Kellner et al.

(10) Patent No.: US 12,794,076 B2
(45) Date of Patent: Nov. 10, 2026

(54) BATTERY SYSTEM FOR A MOTOR VEHICLE, MOTOR VEHICLE COMPRISING THE BATTERY SYSTEM

(71) Applicant: Dr. Ing. h.c. F. Porsche Aktiengesellschaft, Stuttgart (DE)

(72) Inventors: Philipp Kellner, Renningen-Malmsheim (DE); Christoper Volkmer, Niefern-Oeschelbronn (DE); Simon Friess, Kuchen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 726 days.

(21) Appl. No.: 18/133,217

(22) Filed: Apr. 11, 2023

(65) Prior Publication Data

US 2023/0327281 A1 Oct. 12, 2023

(30) Foreign Application Priority Data

Apr. 11, 2022 (DE) ..................... 10 2022 108 741.7

(51) Int. Cl.
*H01M 50/00* (2021.01)
*H01M 50/24* (2021.01)
(Continued)

(52) U.S. Cl.
CPC ......... *H01M 50/383* (2021.01); *H01M 50/24* (2021.01); *H01M 50/249* (2021.01);
(Continued)

(58) Field of Classification Search
CPC ............. H01M 50/308; H01M 50/264; H01M 10/658; Y02E 60/10
See application file for complete search history.

(56) References Cited

U.S. PATENT DOCUMENTS

2013/0004813 A1* 1/2013 Kim .................... H01M 50/308 429/87
2020/0227702 A1 7/2020 Darbandi et al.
(Continued)

FOREIGN PATENT DOCUMENTS

CA 3161363 A1 * 7/2021 .......... H01M 10/658
CN 212810413 3/2021
(Continued)

OTHER PUBLICATIONS

Kong et al. , Battery Module With Improved Fire Protection Performance, Aug. 2022, See the Abstract. (Year: 2022).*
(Continued)

*Primary Examiner* — Tiffany Legette
*Assistant Examiner* — Monique M Wills
(74) *Attorney, Agent, or Firm* — Buchanan Ingersoll & Rooney PC

(57) ABSTRACT

A battery system (102) has a battery cell (104) arranged in a housing (106). The battery protection plate (108) is arranged outside of the housing (106) and a channel (112) is arranged between a wall (110) of the housing (106) and the battery protection plate (108). The battery system (102) further includes a degassing port (114) arranged in the wall (110). A fire protection component (116) is arranged in or on a portion (118) of the battery protection plate (108) facing the channel (112) and in a position opposite the degassing port (114). A vehicle (100) with the battery system (102) also is provided.

19 Claims, 2 Drawing Sheets

(51) Int. Cl.

| | |
|---|---|
| ***H01M 50/249*** | (2021.01) |
| ***H01M 50/383*** | (2021.01) |
| *H01M 10/625* | (2014.01) |
| *H01M 10/6562* | (2014.01) |

(52) U.S. Cl.

CPC ...... *H01M 10/625* (2015.04); *H01M 10/6562* (2015.04); *H01M 2220/20* (2013.01)

(56) References Cited

U.S. PATENT DOCUMENTS

| | | | |
|---|---|---|---|
| 2021/0367307 | A1 | 11/2021 | Raettich et al. |
| 2022/0271359 | A1 | 8/2022 | Torsten |
| 2023/0030022 | A1 | 2/2023 | Walter et al. |

FOREIGN PATENT DOCUMENTS

| | | | | | | |
|---|---|---|---|---|---|---|
| DE | 102012219784 | | | 4/2014 | | |
| DE | 102019131191 | A1 | | 5/2021 | | |
| JP | 2021002420 | A | * | 1/2021 | | |
| KR | 102291119 | B1 | * | 8/2021 | .......... | H01M 50/211 |
| KR | 20220119988 | A | * | 8/2022 | .......... | H01M 50/211 |
| WO | WO-2022003716 | A1 | * | 1/2022 | .......... | H01M 50/503 |

OTHER PUBLICATIONS

Evans et al. Battery Thermal Management Member, Jul. 2021, See the Abstract. (Year: 2021).*

Doiet al. Battery Cell Housing Case and Battery Pack, Jan. 2021, See the Abstract. (Year: 2021).*

Tushar et al., Exhaust System of a Battery Module, Jan. 2022, See the Abstract. (Year: 2022).*

BAE Lithium Polymer Battery With Excellent Fire Protection Performance, Aug. 2021, See the Abstract. (Year: 2021).*

German Search Report dated Nov. 3, 2022.

* cited by examiner

BATTERY SYSTEM FOR A MOTOR VEHICLE, MOTOR VEHICLE COMPRISING THE BATTERY SYSTEM

CROSS-REFERENCE TO RELATED APPLICATION

This application claims priority on German Patent Appl. No 10 2022 108 741.7 filed Apr. 11, 2022, the entire disclosure of which is incorporated herein by reference.

BACKGROUND

Field of the Invention

The invention relates to a battery system for a motor vehicle and a motor vehicle comprising the battery system.

Related Art

Hot gases can be generated in a thermal event in a battery system, and can leak out of the battery cell. These gases can contact oxygen at high temperature and in high concentrations. Thus, the gases can ignite to produce a flame. Flame formation outside the motor vehicle during the thermal event should be avoided.

One way to prevent flame formation is to cool the hot gas prior to the exit of the hot gas from the motor vehicle. For example, the gas can be directed through channels and cooled by surface contact with the channels.

DE 10 2012 219 784 A1 discloses a battery module with a degassing channel bounded by a plate made of a heat-resistant plastic, among other things. The channel heats up depending on the gas quantity, the channel length, and the material used. A direct flow of hot particulate gas can damage the walls of the channel.

SUMMARY

A battery system in accordance with this disclosure comprises a battery cell arranged in a housing and a battery protection plate arranged outside of the housing. A channel is arranged between a wall of the housing and the battery protection plate and a degassing port is arranged in the wall. The battery system further comprises a fire protection component that is arranged in or on a portion of the battery protection plate facing the channel, and more particularly, a portion that lies opposite the degassing port. This arrangement increases vehicle safety.

The battery protection plate of some embodiments comprises a fiber composite material or consists of a fiber composite material. This achieves a significant weight reduction compared to battery protection with monolithically heat-resistant material, such as steel.

In one embodiment, the fire protection component comprises an insert into the battery protection plate. The insert may be formed by an intrinsic manufacturing process, such wet pressing or resin transfer molding or thermoplastic pressing.

In one embodiment, the fire protection component comprises steel, ceramic, or a high-temperature resistant fiber-plastic composite material or an aerogel or mica.

The fire protection component may comprise a fire protection varnish, in particular a fire protection varnish applied to the battery protection plate.

The fire protection component of some embodiments is configured and arranged so that a gas jet from the degassing port is deflected substantially by 90°.

Some embodiments have plural degassing ports arranged in the wall, and at least one fire protection component is arranged in or on the battery protection plate opposite the degassing ports. Thus, a heat-resistant battery protection plate is provided in the essential areas.

In one embodiment, plural battery cells are arranged in the housing, and at least one degassing port per battery cell is arranged adjacent the battery cell in the wall.

The battery protection plate of some embodiments has a heat-resistant fibrous-plastic composite material layer on its side facing the channel, a fibrous-plastic composite material layer on its side facing away from the channel, and a foam core between the heat-resistant fibrous-plastic composite material layer and the fibrous-plastic composite material layer.

The battery system of some embodiments has plural housings that are sealed individually. These housings may be mounted individually on a body of the motor vehicle.

A vehicle comprising the battery system also is provided.

In one embodiment, the vehicle comprises plural housings of the battery system. The housings are mounted (e.g. by bolting) on a body of the vehicle.

DETAILED DESCRIPTION

Figure 1:
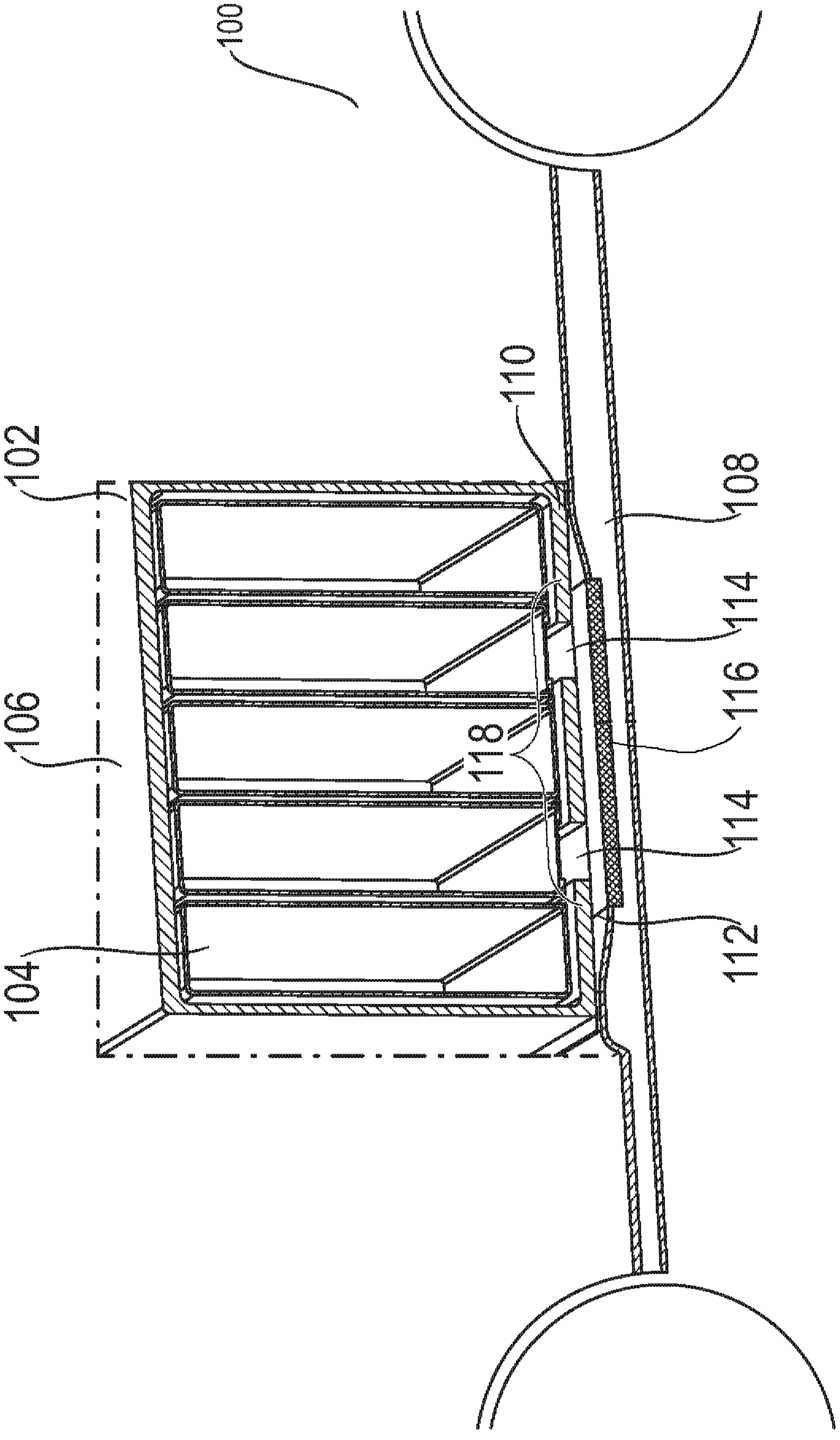
FIG. 1 a schematic illustration of a motor vehicle.

A motor vehicle 100 is shown schematically in FIG. 1. The vehicle 100 comprises a battery system 102 having at least one battery cell 104 arranged within a housing 106. In the example, plural battery cells 104 are arranged within a housing 106.

The battery system 102 comprises a battery protection plate 108 arranged outside of the housing 106, and a channel 112 arranged between a wall 110 of the housing 106 and the battery protection plate 108.

At least one degassing port 114 is arranged in the wall 110 of the housing 106.

The battery system 102 further comprises a fire protection component 116 arranged in or on a section 118 of the battery protection plate 108 facing the channel 112 at a location opposite the at least one degassing port 114.

In the example, plural degassing ports 114 are arranged in the wall 110 of the housing 106, and at least one fire protection component 116 is arranged in or on the battery protection plate 108 to oppose the degassing ports 114.

Plural battery cells 104 are arranged in the housing 106, but only one battery cell 104 can be provided. A degassing port 114 is arranged adjacent each second battery cell 104 in FIG. 1. However, in some embodiments, at least one degassing port 114 is arranged adjacent to each battery cell 104 in the wall 110. The number and assignment of the degassing ports 114 can also be arranged differently.

The battery protection plate 108 can comprise a fiber composite material or can consist of a fiber composite material.

In some embodiments, the fire protection component 116 comprises an insert into the battery protection plate 108, in particular an insert from an intrinsic manufacturing process, preferably wet pressing or resin transfer molding or thermoplastic pressing.

The fire protection component 116 can comprise steel, ceramic, or a high-temperature resistant fiber-plastic composite material or an aerogel or mica.

The fire protection component 116 can comprise a fire protection varnish. The fire protection varnish can be applied to the battery protection plate 108.

In one embodiment, the fire protection component 116 is configured and arranged such that a gas jet flowing out of the degassing port 114 is deflected substantially by 90°.

The battery protection plate 108 has a heat-resistant fibrous-plastic composite material layer on its side facing the channel 112 and a fibrous-plastic composite material layer on its side facing away from the channel 112. In one embodiment, a foam core is arranged between the heat-resistant fibrous-plastic composite material layer and the fibrous-plastic composite material layer. The battery protection plate 108 can also be not fully or only partially heat-resistant on its side facing the housing 106.

The battery system 102 can comprise a plurality of housings 106, that are sealed individually.

Figure 2:
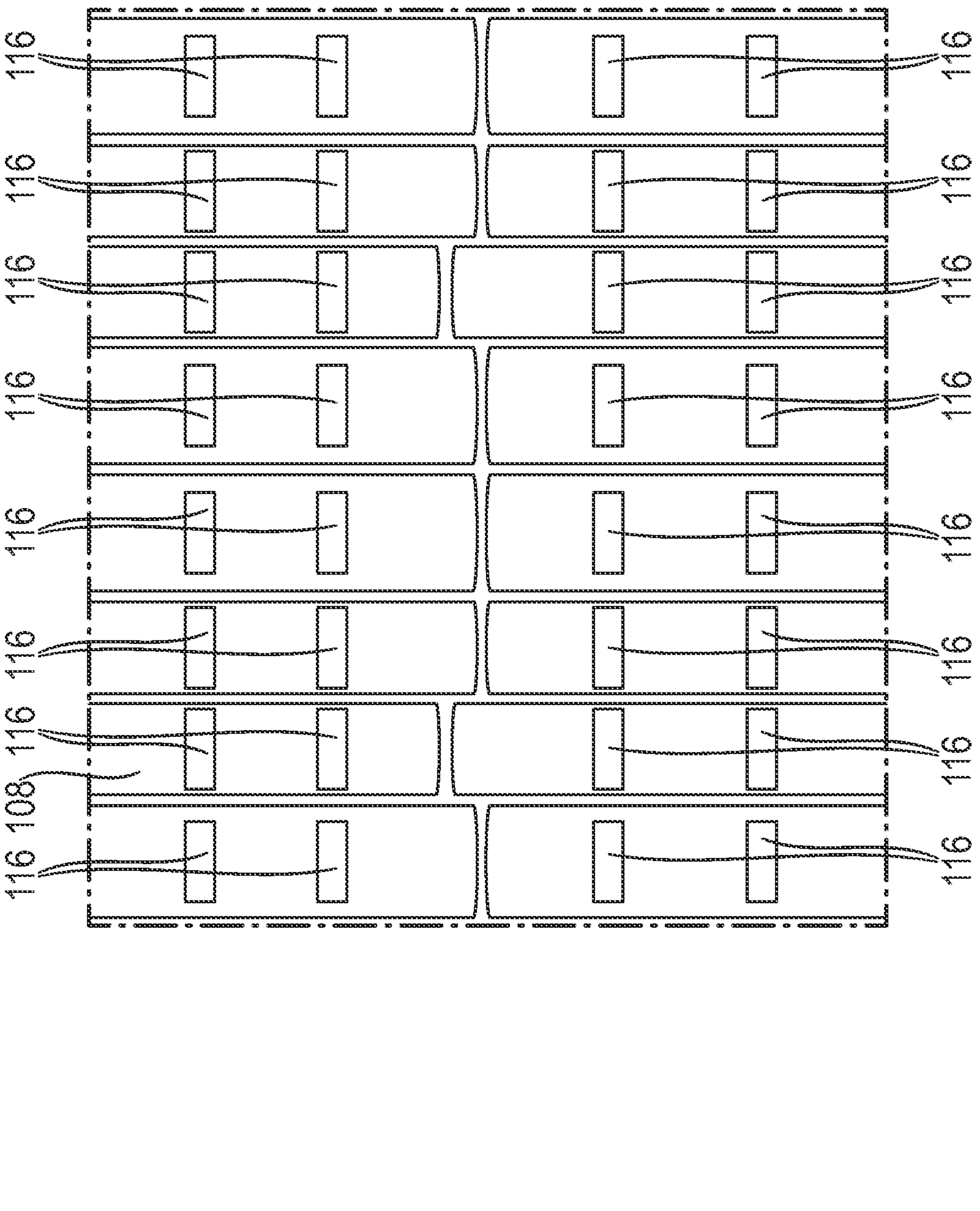
FIG. 2 a schematic illustration of a motor battery protection plate.

FIG. 2 is a schematic illustration of an embodiment of the battery protection plate 108. The battery protection plate 108 comprises a plurality of fire protection components 116. In the example, eight respective fire protection components 116 are arranged in four rows extending parallel to each other in the view of the battery protection plate 108 shown in FIG. 2.

The invention claimed is:

1. A battery system (102), comprising:
- a housing (106);
- a battery cell (104) arranged in the housing (106);
- a battery protection plate (108) arranged outside of the housing (106);
- a channel (112) arranged between a wall (110) of the housing (106) and the battery protection plate (108);
- a degassing port (114) arranged in the wall (110); and
- a fire protection component (116) arranged in or on a portion (118) of the battery protection plate (108) facing the degassing port (114) and the battery cell (104), the portion (118) being opposed to the degassing port (114), and the fire protection component (116) being spaced apart from the wall (110) of the housing (106) and the battery cell (104),
- wherein the fire protection component (116) comprises an insert that is formed in or on the battery protection plate (108).

2. The battery system (102) of claim 1, wherein the battery protection plate (108) comprises a fiber composite material or consists of a fiber composite material.

3. The battery system (102) of claim 1, wherein the insert of the battery protection plate (108) that forms the fire protection component (116) is formed from an intrinsic manufacturing process, wherein the intrinsic manufacturing process comprises wet pressing, resin transfer molding or thermoplastic pressing.

4. The battery system (102) of claim 3, wherein the insert of the battery protection plate (108) that forms the fire protection component (116) is formed by wet pressing.

5. The battery system (102) of claim 3, wherein the insert of the battery protection plate (108) that forms the fire protection component (116) is formed by resin transfer molding.

6. The battery system (102) of claim 3, wherein the insert of the battery protection plate (108) that forms the fire protection component (116) is formed by thermoplastic pressing.

7. The battery system (102) of claim 1, wherein the fire protection component (116) comprises steel.

8. The battery system (102) of claim 1, wherein the fire protection component (116) comprises ceramic.

9. The battery system (102) of claim 1, wherein the fire protection component (116) comprises a high-temperature-resistant fibrous-plastic composite material.

10. The battery system (102) of claim 1, wherein the fire protection component (116) comprises an aerogel.

11. The battery system (102) of claim 1, wherein the fire protection component (116) comprises mica.

12. The battery system (102) of claim 1, wherein the fire protection component (116) comprises a fire protection varnish applied to the battery protection plate (108).

13. The battery system (102) of claim 1, wherein the fire protection component (116) is configured and arranged such that a gas jet flowing out of the degassing port (114) is substantially deflected by 90°.

14. The battery system (102) of claim 1, wherein plural degassing ports (114) are arranged in the wall (110), at least one fire protection component (116) per degassing port (114) is arranged in the battery protection plate (108) opposite the degassing port (114).

15. The battery system (102) of claim 1, wherein a plurality of battery cells (104) are arranged in the housing (106), wherein at least one degassing port (114) per battery cell (104) is arranged adjacent to said battery cell (104) in the wall (110).

16. The battery system (102) of claim 1, wherein the battery protection plate (108) comprises a heat-resistant fibrous-plastic composite material layer on its side facing the channel (112), a fibrous-plastic composite material layer on its side facing away from the channel (112), and a foam core is arranged between the heat-resistant fibrous-plastic composite material layer and the fibrous-plastic composite material layer.

17. The battery system (102) of claim 1, wherein the battery system (102) comprises a plurality of housings (106) that are individually sealed.

18. A vehicle (100), comprising the battery system (102) of claim 1.

19. The vehicle (100) of claim 1, wherein a plurality of housings of the battery system (102) are mounted on a body of the motor vehicle (100).

* * * * *